United States Patent
Kwon

(10) Patent No.: US 9,489,725 B2
(45) Date of Patent: Nov. 8, 2016

(54) METHOD AND DEVICE FOR EXPANDING A DYNAMIC RANGE OF DISPLAY DEVICE

(71) Applicant: LG Display Co., Ltd., Seoul (KR)

(72) Inventor: Kyungjoon Kwon, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 14/920,473

(22) Filed: Oct. 22, 2015

(65) Prior Publication Data

US 2016/0132999 A1 May 12, 2016

(30) Foreign Application Priority Data

Nov. 10, 2014 (KR) .................. 10-2014-0155677

(51) Int. Cl.
| | |
|---|---|
| G06T 5/00 | (2006.01) |
| G06K 9/46 | (2006.01) |
| G06K 9/62 | (2006.01) |
| G06T 7/40 | (2006.01) |
| G09G 3/00 | (2006.01) |

(52) U.S. Cl.
CPC ............. *G06T 5/008* (2013.01); *G06K 9/4652* (2013.01); *G06K 9/4661* (2013.01); *G06K 9/6215* (2013.01); *G06T 5/009* (2013.01); *G06T 7/408* (2013.01); *G09G 3/00* (2013.01); *G06T 2207/20028* (2013.01); *G06T 2207/20208* (2013.01)

(58) Field of Classification Search
CPC .................. G06T 5/008; G06T 2207/20028; G06T 2207/20012; G06K 9/4652; G09G 2340/06; G09G 2360/16; H04N 1/60
See application file for complete search history.

(56) References Cited

U.S. PATENT DOCUMENTS

| | | | | |
|---|---|---|---|---|
| 2009/0091660 | A1* | 4/2009 | Wang | ............ H04N 9/68 348/649 |
| 2013/0222414 | A1* | 8/2013 | Ito | ............. G09G 5/02 345/600 |
| 2013/0322753 | A1* | 12/2013 | Lim | ........... G06T 5/001 382/167 |
| 2014/0016301 | A1* | 1/2014 | Brown Elliott | ... G02F 1/133603 362/97.1 |

OTHER PUBLICATIONS

Monobe et al., Dynamic Range Compression Preserving Local Image Contrast for Digital Video Camera, Feb. 2005, IEEE Transactions on Consumer Electronics, vol. 51, No. 1, p. 1-25.*

* cited by examiner

*Primary Examiner* — Gregory J Tryder
*Assistant Examiner* — Yuehan Wang
(74) *Attorney, Agent, or Firm* — Fenwick & West LLP

(57) ABSTRACT

An apparatus generates pixel data in a display. RGB pixel data is received corresponding to a target pixel of an image. A local adaption level is determined for the RGB pixel data representing perceived brightness of the RGB pixel data. The local adaption level is modified to generate a modified local adaption level. A transfer curve is generated based on the modified local adaption level and the transfer curve is applied to the input RGB pixel data. A local dimming value is generated to drive a light source driver of the display based on RGB pixel data for each of the pixels in the local dimming block and RGBW pixel data for each of the pixels in the local dimming block.

21 Claims, 9 Drawing Sheets

FIG. 2

| R | G | B | W | R | G | B | W |
|---|---|---|---|---|---|---|---|
| B | W | R | G | B | W | R | G |
| R | G | B | W | R | G | B | W |
| B | W | R | G | B | W | R | G |

GENERATE ALx, y BY SETTING
WEIGHT TO PERCENTAGE OF
OVERLAPPING AREA AND SIMILARITY
BETWEEN CORRESPONDING PIXEL
AND EACH LOCAL AREA (A)                  (B)

(A)  X  (B)  =  (C)

(A)  (B)

METHOD AND DEVICE FOR EXPANDING A DYNAMIC RANGE OF DISPLAY DEVICE

This application claims the benefit of Korean Patent Application No. 10-2014-0155677 filed on Nov. 10, 2014, the entire contents of which is incorporated herein by reference for all purposes as if fully set forth herein.

BACKGROUND

1. Field

The present invention relates to a method and apparatus for expanding a dynamic range of a display device so as to implement High Dynamic Range (HDR) using a RGBW-type pixel array.

2. Related Art

An active matrix-type Liquid Crystal Display (LCD) device is a switching device that displays an image using a Thin Film Transistor (TFT). The LCD device includes a display panel and a Back Light Unit that irradiates light on the display panel.

There are increasing demands for an HDR display device which displays a reproduced image to make a user to feel as if he is seeing a real scene. The HDR display device needs to secure a physical capability of expressing irradiation at thousands of nits and a technology of converting Low Dynamic Range (LDR) contents to be suitable for the HDR display device. Many efforts have been made to study the HDR display device, but there is no relevant technology that is widely used.

For example, attempts have been made to implement a High Dynamic Range (HDR) display device based on a LCD device, but to no avail. One of the attempts is U.S. Patent Publication No. 2011/0279749 A1 (Nov. 17, 2011) which seeks a high dynamic range by laminating two LCD panel on a backlight unit, wherein the one LCD panel is used to display an image and the other LCD panel is used as a dimming panel for controlling brightness in a local area. However, this art uses two LCD panels so it is thick and requires more costs. In addition, it enhances contrast by making a dark image even darker, not making a bright image much brighter, so that it cannot implement a HDR display device in the true sense of the term.

Improving contrast simply by using a local dimming method may lead to a linear increase in brightness properties, possibly causing brightness of an intermediate gray scale to increase. As a result, if contrast is enhanced using only the local dimming method, an observer may feel an image glaring.

SUMMARY

The present invention provides a method and apparatus for expanding a dynamic range of a display device so as to implement a High Dynamic Range (HDR) display device with low costs.

An apparatus generates pixel data in a display. A local adaption calculator circuit receives RGB pixel data corresponding to a target pixel of an image, determines a local adaption level for the RGB pixel data representing perceived brightness of the RGB pixel data, and modifies the local adaption level to generate a modified local adaption level. A transfer curve generator circuit generates a transfer curve mapping input values to output values. The transfer curve has a decreasing gradient for input values above the modified local adaption level and the transfer curve has an increasing gradient for input values below the modified local adaption level. The transfer curve provides a 1:1 mapping at the modified local adaption level. A data stretcher circuit applies the transfer curve to the input RGB pixel data to map the input RGB pixel data to output RGB pixel data. An RGBW converter circuit converts the output RGB pixel data to RGBW pixel data to drive the target pixel. A dimming value generator circuit generates for a local dimming block that includes the target pixel and a plurality of neighboring pixels, a local dimming value to drive a light source driver of the display. The local dimming block is generated based on RGB pixel data for each of the pixels in the local dimming block and RGBW pixel data for each of the pixels in the local dimming block.

In another embodiment, a method includes steps similar to those described above.

In yet another embodiment, a non-transitory computer-readable storage medium stores instructions that when executed by one or more processors causes the one or more processors to perform steps similar to those described above.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

Figure 2:
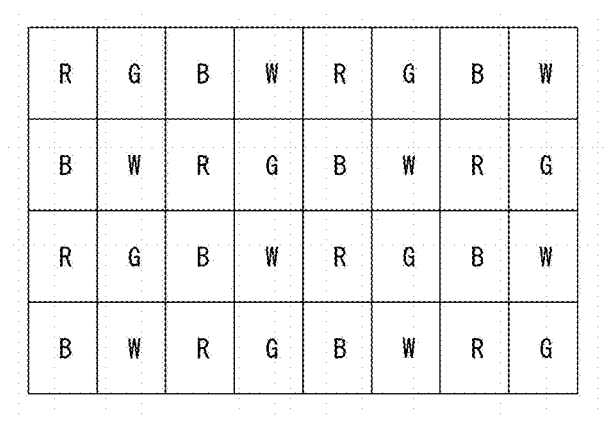

FIG. 2 is a diagram illustrating color arrangement in a pixel array;

DETAILED DESCRIPTION OF THE EMBODIMENTS

A display device of the present invention may be a flat display device having white subpixels (hereinafter, referred to as "W subpixels") which irradiate white lights, for example, a RGBW-type LCD device.

The present invention expresses a bright image more brightly using a RGBW-type LCD device, thereby expanding an upper dynamic range. The present invention adjusts a transfer function curve on a local area unit basis according to an input image so as to expand contrast of a local area, and utilizes this method in association with a local dimming method for a backlight. Herein, the transfer function curve is for adjusting gamma properties of pixel data.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
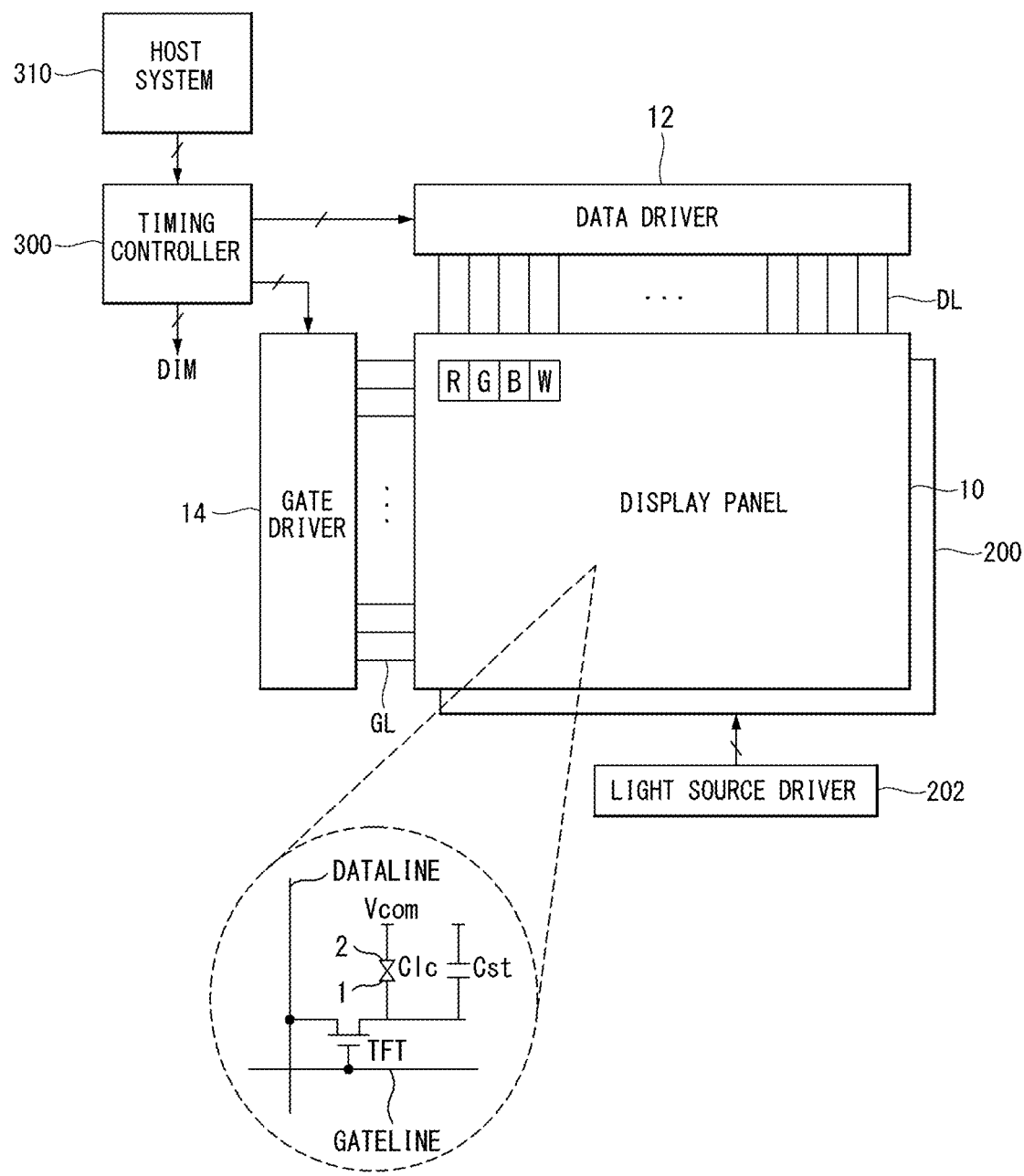
FIG. 1 is a block diagram illustrating a display device according to an exemplary embodiment of the present invention.

Referring to FIG. 1, a display device of the present invention includes a display panel 10, a display panel driver, a backlight unit 200, and a light source driver 202.

A pixel array of the display panel 10 displays an input image by using Data Lines (DLs), Gate Lines (GLs) crossing the DLs, and pixels arranged in a matrix format. The pixels are classified into red (R) subpixels, green (G) subpixels, blue (B) subpixels, and white (W) subpixels. The white subpixels do not have a color filter. R data is written to the R subpixels, G data is written to the G subpixels, B data is written to the B subpixels, and W data is written to the W subpixels. Each subpixel includes a liquid crystal cell (Clc), a storage capacitor (Cst), and a Thin Film Transistor (TFT). The liquid crystal cell (Clc) adjusts transmittance according to data by delaying a phase of light using liquid crystals enabled to be driven by an electric field between a pixel electrode 1, to which data voltage is applied through the TFT, and a common electrode 2, to which common voltage is applied. The TFT is turned on by gate pulse from the GLs so as to supply data voltage from the DLs to a pixel electrode.

The display panel may be any know liquid crystal mode, including a Twisted Nematic (TN) mode, a Vertical Alignment (VA) mode, an In Plane Switching (IPS) mode, and a Fringe Field Switching (FFS) mode. The LCD device may be embodied in various forms, including a transparent LCD device, a semi-transparent LCD device, and a reflective LCD device. Each of the transparent LCD device and the semi-transparent LCD device include the backlight unit 200 and the light driver 202.

The backlight unit 200 may be an edge-type backlight unit or a direct-type backlight unit. The backlight unit 200 is arranged below the back surface of the display panel 10 to irradiate lights to the display panel 10. The light source driver 202 supplies currents to the light sources to emit lights. The light source driver 202 controls brightness of the light sources by adjusting currents to be applied to the light sources in accordance of a dimming signal (DIM) from a timing controller 300. The dimming signal controls brightness of an individual light source on the basis of a local dimming block unit. The light sources may be Light Emitting Diodes (LEDs).

The display panel driver writes data to pixels of the display panel 10. The display panel driver may include a data driver 12, a gate driver 14, and a timing controller 300. In addition, the display panel driver writes RGBW data to pixels by generating the RGBW data through data stretching, RGBW conversion, and gamma correction in the data driver 12, the gate driver 14, and the timing controller 300, as described in the following.

The data driver 12 generates data voltage by converting digital video data of an image received from the timing controller into gamma correction voltage, and supplies the data voltage to the DLs of the display panel 10. Under the control of the timing controller 130, the gate driver 14 supplies the GLs with gate pulse that is in sync with the data voltage supplied to the DLs, and shifts the gate pulse sequentially.

The timing controller 300 transmits digital video data of an image received from a host system 310 to the data driver 12. The timing controller 300 may convert RFB data of an input image into RGBW data using a white gain calculating algorithm based on spectrum exchange. Any well-known white gain calculating algorithm may be used.

White light generated from W subpixel includes light of R wavelength, light of G wavelength, and light of B wavelength. Light of RBG subpixels displaying received RGB data should be exactly the same as light of RGBW subpixels displaying RGBW data, which is converted RGB data. Spectrum exchange is implemented by generating W data to be written to W subpixels and subtracting the RGB data to be written to the RGB subpixels, so that light quantity of RGB wavelength from RGB subpixels may be reduced as much as light quantity of RGB wavelength generated in W subpixels.

Figure 3:
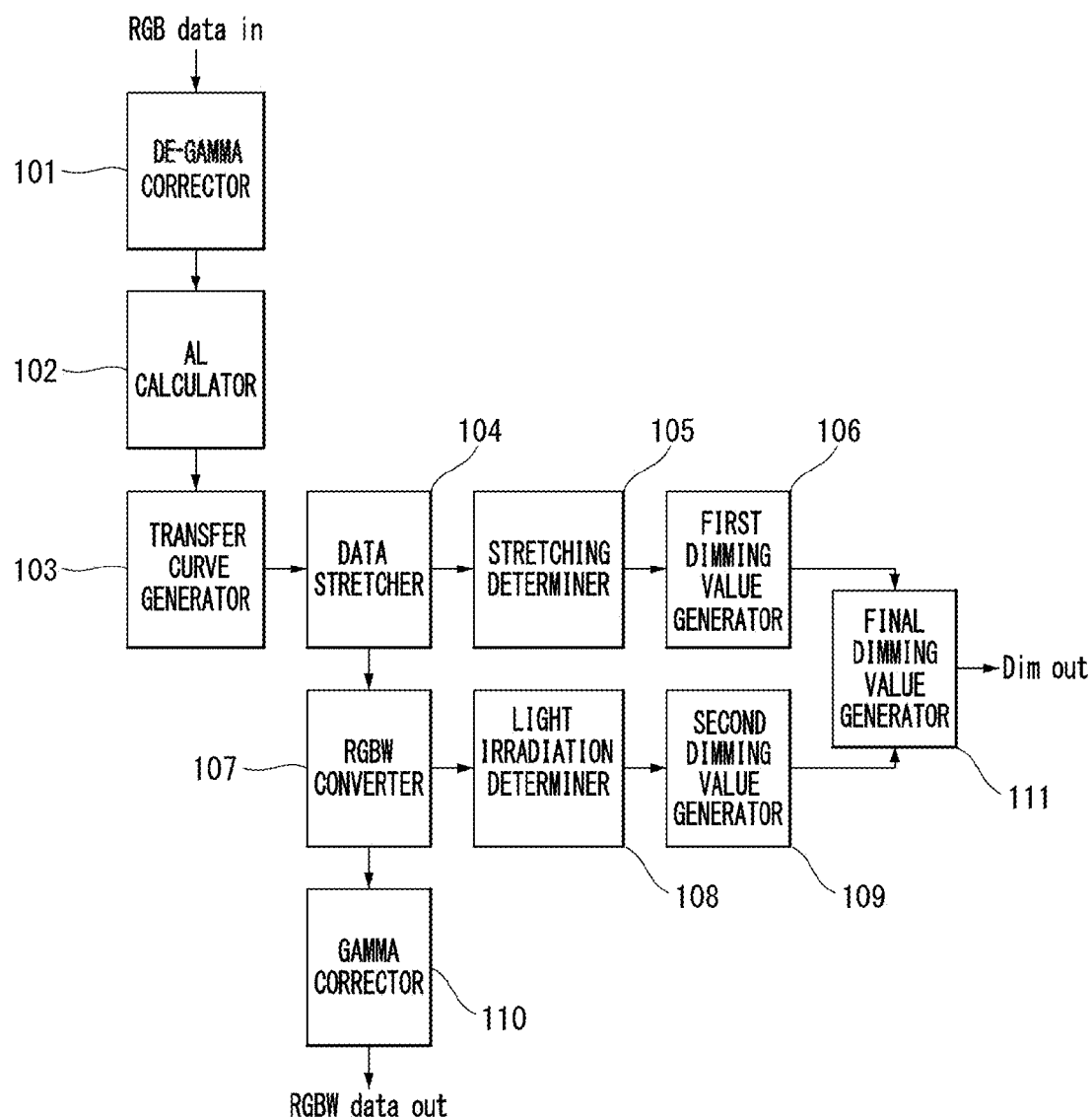
FIG. 3 is a block diagram illustrating an apparatus for expanding a dynamic range of a display device.

Being in sync with digital video data, the timing controller 300 controls operation timing of the data driver 12 and the gate driver 14 using timing signals, such as a vertical sync signal, a horizontal sync signal, a data enable signal, a main clock signal, and the like. The timing controller 300 includes an apparatus for expanding a dynamic range, as illustrated in FIG. 3.

The apparatus for expanding a dynamic range divides a screen of the display panel 10 into a plurality of local areas (which may overlap), and analyzes a local adaption level (ALx,y) of a Human Visual System (HVS) in each local area, where x,y refers to a pixel location around which the local area is based. In addition, based on a result of the analysis, the apparatus generates a transfer curve and modulate data using the transfer curve. In addition, the timing controller 300 generates a diming signal (DIM) to control brightness of a backlight.

The host system 310 may be any one of a TV system, a Set-Top box, a navigation system, a DVD player, a Blu-ray player, a PC, a home theater system, and a phone system. The host system 310 converts resolution of an input image to fit resolution of the display panel 10 by using a scaler, and then transmits the input image to the timing controller 300 along with a timing signal.

Transmittance of a display panel of a RGBW-type LCD device is 7%. In the case where brightness of the backlight unit 200 enabled to implement local dimming has 14,000 nits, while the maximum brightness of a RGB-type LCD device is 1,000 nits. By contrast, transmittance of the display panel 10 of the RGBW-type LCD device is approximately 10.5%. In the case where brightness of the backlight unit 200 enabled to implement local dimming is 14,000 nits, the maximum brightness of the RGBW-type LCD device is 1,500 nits. Thus, the present invention secures physical capability of an HDR display device by using a RGBW display panel without an additional LCD panel or a high bright backlight unit.

Figure 4:
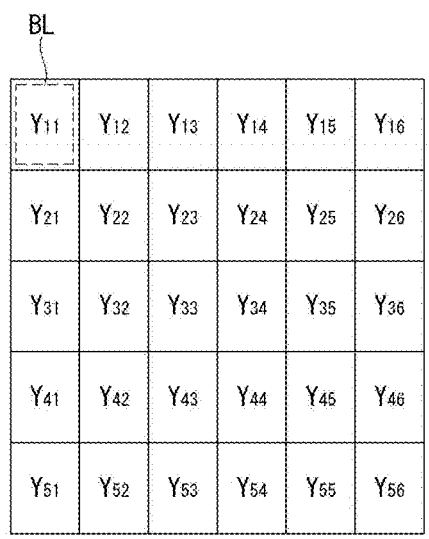
FIG. 4 is a diagram illustrating average brightness for each local block.
Figure 5:
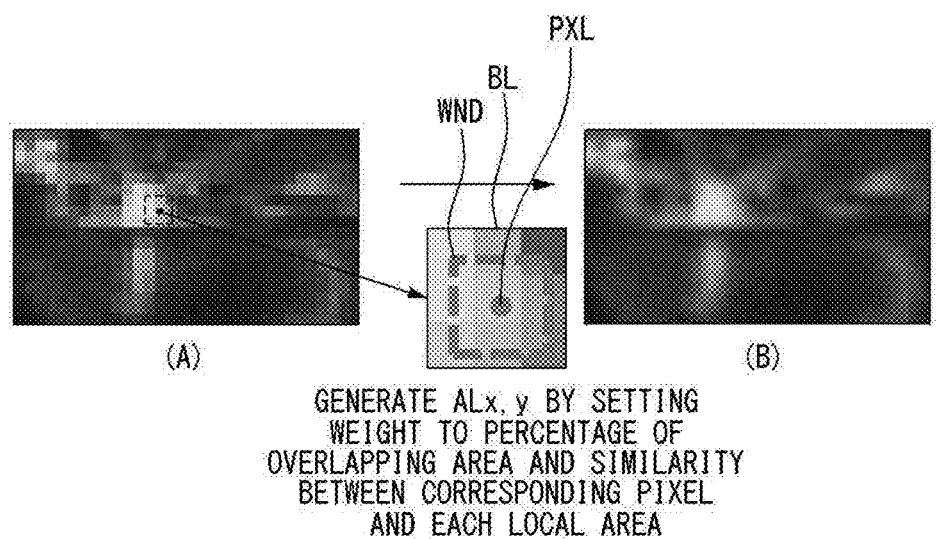
FIG. 5 is a diagram illustrating an adaption level of each local area.

FIG. 3 is a block diagram illustrating an apparatus for expanding a dynamic range of a display device. In an embodiment, the apparatus of FIG. 3 may be implemented, for example, as a component of the timing controller 300. FIG. 4 is a diagram illustrating average brightness of each local block which may comprise a plurality of pixels (e.g., a 2×2 or 3×3 array of pixels). FIG. 5 is a diagram illustrating an adaption level (ALx,y) for a pixel at a pixel location x,y, which is calculated based on the local area surrounding the pixel at the pixel location x,y. FIGS. 6 to 10 are diagrams illustrating transfer curves that are variable according to an adaption level of a given pixel.

Referring to FIG. 3, the apparatus includes a de-gamma corrector 101, an adaption level calculator (hereinafter, referred to as an "AL calculator") 102, a transfer curve generator 103, a data stretcher 104, a RGBW converter 107, a gamma corrector 110, a stretching determiner 105, a first dimming value generator 106, a light irradiation determiner 108, a second dimming value generator 109, and a final dimming value generator 111.

The de-gamma corrector 101 receives RGB data of an input image. The RGB data of an input image is data which is gamma corrected through a camera. The de-gamma corrector 101 performs de-gamma correction on data of an input image for convenience of digital signal processing.

The AL calculator 102 virtually divides a pixel array into a plurality of local blocks (BLs), as shown in FIG. 4, and calculates average brightness of each block BL (Y11~Y56). Each block BL may be set to have size equal to or greater than 2×2 pixel size.

The AL calculator 102 identifies a local area WND of a predetermined size surrounding each pixel, as shown in FIG. 5. The local area WND for a target pixel includes all of the neighboring pixels within a plurality of blocks surrounding the given pixel. The AL calculator 102 outputs a local adaption level (ALx,y) for the target pixel at pixel location x,y that defines brightness which an observer observes when viewing the local area WND corresponding to the target pixel at pixel location x,y. Each local area WND may be set to have size of between 2×2 local block and 3×3 local block, but aspects of the present invention is not limited thereto. The AL calculator 102 may easily calculate a local adaption level (ALx,y) using a bilateral filter. The bilateral filter sets a weight to distribution of brightness in surroundings of a corresponding pixel PXL and similarity between brightness of pixels, and outputs a local adaption level (ALx,y) which is determined according to brightness in surroundings of a pixel PXL and similarity in brightness between pixels in a local area WND.

For example, in one embodiment, the local adaption level (ALx,y) for a pixel at pixel location x,y can be computed by determining a brightness value of the pixel and applying the bilateral filter in Equation 1 below:

$$AL_{x,y} = \sum_{BLi \in WND} \frac{Overlap(Bli, WND)}{Area(WND)} (Yi)(Similarity(PXL_{x,y}, Yi))$$ [Equation 1]

where $BL_i$ represents a block i that at least partially overlaps the local area WND corresponding to the pixel at pixel location x,y; Overlap(WND, BLi) represents an overlap ratio between the block BLi and the local area WND, Area(WND) represents the area of the local area, Yi represents the average brightness of the pixels in the block BLi, and Similarity (PXLx,y, Yi) comprises a similarity metric representing a similarity (e.g., a distance) between the brightness PXLx,y of the pixel at pixel location x,y and the average brightness Yi of the block BLi. In alternative embodiments, a different equation may be used having the same general characteristics.

Qualitatively, local adaption level (ALx,y) represents brightness of a pixel considering a degree of adaptivity of an observer in a local area. A high local adaption level (ALx,y) indicates that an observer in a local area under a bright environment looks at a corresponding pixel. A low local adaption level (ALx,y) indicates that an observer in a local area under a dark environment looks at a corresponding pixel.

The local adaption level (ALx,y) for a target pixel represents perceived average brightness of each local area WND according to brightness and similarity of surrounding pixels by reflecting brightness adapting capability of humans. The more bright pixels are in surroundings of a corresponding pixel in a local area WND, the higher local adaption level (ALx,y) is given. Alternatively, the more dark pixels are in surroundings of a corresponding pixel in a local area WND, the lower local adaption level (ALx,y) is given. At this point, to prevent halo artifacts, a weight is set for similarity so that an adaption level of a local area is calculated using surrounding pixels similar to a corresponding pixel.

Figure 6:
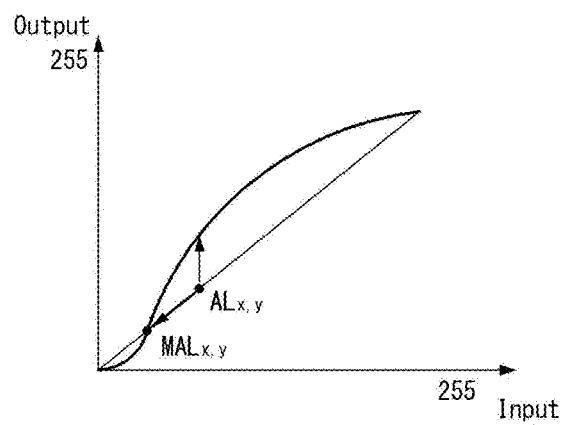
FIGS. 6 to 10 are diagrams illustrating transfer curves that are variable according to an adaption level of each local area.
Figure 9:
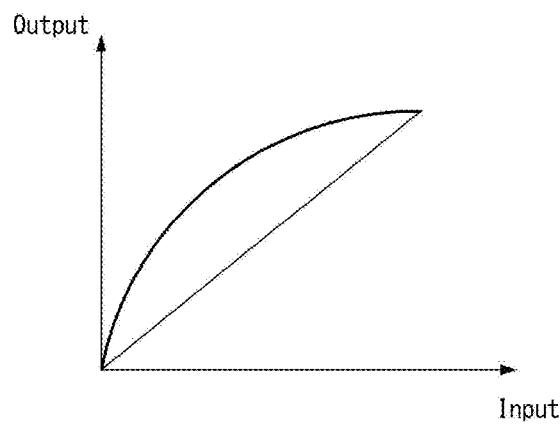
Figure 10:
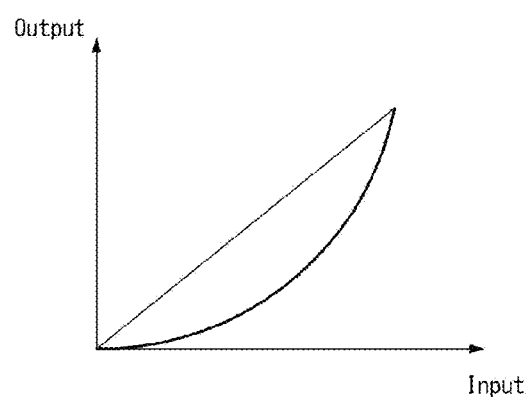

The transfer curve generator 103 adjusts data stretching intensity of each pixel based on a local adaption level. Data stretching intensity may be adjusted based on a transfer curve (shown in FIG. 6 to FIG. 10) of which gradient is variable according to a local adaption level (ALx,y). In FIGS. 6 and 10, X axis indicates input gray scale of an image and Y axis indicates output gray scale of the image. Data of an input image is modulated into an output gray scale which meets an input gray scale on a transfer curve. The transfer curve has an intersection point with a reference straight line having gradient of 1, and an input gray scale and an output gray scale are equal to each other on the reference straight line (i.e., the transfer curve provide a 1:1 mapping at the intersection point). The transfer curve is divided into a concave curve (e.g., having a decreasing gradient) below the intersection point and a convex curve (e.g., having an increasing gradient) above the intersection point. An inflection point occurs at the intersection. The intersection point is determined by a modulated local adaption level (MALx,y). The local adaption level is changed to the modulated local adaption level (MALx,y) in order to increase a stretching rate in high and lower gray scales. The stretching rate is proportional to gradient of a transfer curve that defines a gray-scale modulation amount of data. The modulated local adaption level (MALx,y) may be defined by Equation 1. If an intersection point between a transfer curve and a reference straight line is shifted from a local adaption level (ALx,y) to a modulated local adaption level (MALx,y), data of an input image is modulated in surroundings of the local adaption level (ALx,y) in a direction where upper gray scales and lower gray scales can be restored better.

The modulated local adaption level (MAL x,y) is defined as in Equation 2.

$$MAL_{x,y} = \alpha \times (AL_{x,y} - \beta) + \beta$$ [Equation 2]

If $MAL_{x,y} > 255$, then $MAL_{x,y} = 255$,
else if $MAL_{x,y} < 0$, then $MAL_{x,y} = 0$.

Herein, AL(x,y) denotes a local adaption level, and MALx,y denotes a modified local adaption level. In addition, α is a constant value for adjusting stretching intensity, and β denotes an intermediate gray scale, for example, '128' in the case of 8 bit depth. In one embodiment, Equation 2 may be implemented in hardware by, for example, a pair of adder circuits and a scaler circuit (e.g., a shift register).

Figure 7:
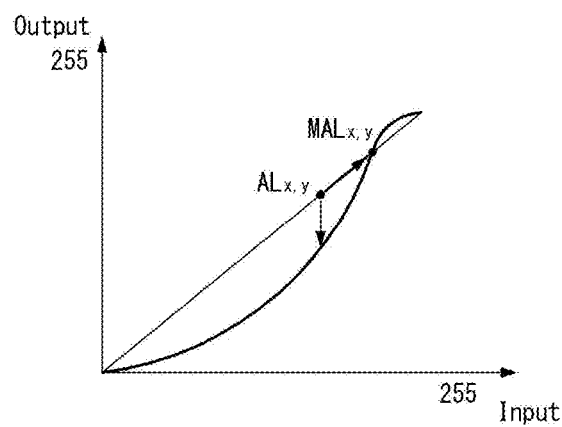
Figure 8:
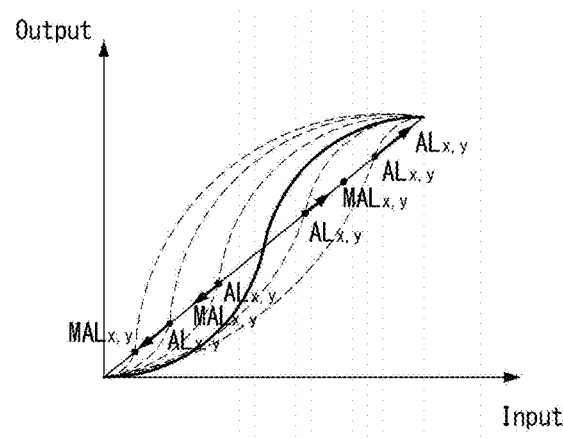

As shown in FIGS. 6 to 8, if distance from the intermediate gray scale β becomes further, the modulated local adaption level (MALx,y) also becomes further distant from the local adaption level (ALx,y), thereby leading to intense data stretching in upper gray scales and lower gray scales. If the modulated local adaption level (MALx,y) is located in lower gray scales, as shown in FIG. 6, a transfer curve goes up, upper gray scales are modulated to be much higher and lower gray scales are modulated to be much lower, strong stretching intensity indicates a large modulated amount. Alternatively, if the modulated local adaption level (MALx, y) is located in upper gray scales, as shown in FIG. 7, a transfer curve goes down, leading to intense data stretching in lower gray scales. FIG. 8 illustrates an example in which a distance between a modulated local adaption level (MALx, y) and a local adaption level (ALx,y) increases as a distance from an intermediate gray scale becomes further. FIG. 9 illustrates a transfer curve in the case of MALx,y=0. Such a data stretching intensity adjusting method restores an upper dynamic range and lower dynamic range of an LDR image to a level of a dynamic range before compression, thereby converting the LDR image into a HDR image. The transfer curve is adjusted for each pixel based on its individual local area according to a local adaption level.

There are mainly two ways for obtaining an LDR image. The first way is compressing an upper dynamic range and a lower dynamic range by tone mapping an HDR image. The second way is compressing an upper dynamic range and a lower dynamic range when obtaining an image from a camera. Therefore, in any case, an upper dynamic range and a lower dynamic range of an LDR image are compressed, compared with a dynamic range of an image of an actual object.

Figure 11:
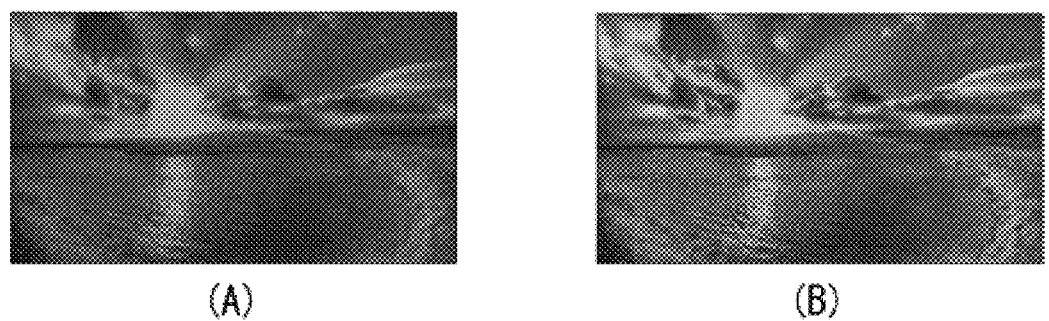
FIG. 11 is a diagram illustrating comparison between an image before data stretching and an image after data stretching.

The data stretcher 104 performs data stretching by modulating RGB data of an input image based on a transfer curve, for example, by applying a gain to each of the RGB data values. The AL calculator 102, the transfer curve generator 104, and the data stretcher 104 adjust data stretching intensity in each local area to a higher level in upper gray scales and lower gray scales by considering a brightness adapting capability of humans. Diagram (A) in FIG. 11 is an input LDR image of which dynamic range of upper gray scales and dynamic range of lower gray scales are compressed. Diagram (B) in FIG. 11 is an image on which data stretching has been performed by the data stretcher 104.

The RGBW converter 107 receives modulated RGB data from the data stretcher 104, and converts the modulated RGB data into RGBW data based on spectrum exchange. Light of RGB subpixels displaying input RGB data should be exactly the same as light of RGBW subpixels displaying for RGBW data which is converted RGB data. Spectrum exchange is implemented by generating W data to be written to W subpixels and subtracting the RGB data to be written to the RGB subpixels, so that light quantity of RGB wavelength from RGB subpixels may be reduced as much as light quantity of RGB wavelength generated in W subpixels. Any well-known method for generating RGBW data may be applied. For example, white gain calculation algorithms disclosed in Korea Patent Application Nos. 10-2005-0039728 (May 12, 2005), 10-2005-0052906 (Jun. 20, 2005), 10-2005-0066429 (Jul. 21, 2005), or 10-2006-0011292 (Feb. 6, 2006) may be applied.

The RGBW data output from the RGBW converter 107 is gamma-corrected by the gamma corrector 110, and then transmitted to the data driver 12.

Due to data stretching for each pixel based on its local area according to an adaption level (APx,y), intense data stretching occurs in an upper dynamic range and a lower dynamic range. Due to the data stretching, the upper part of a transfer curve defining upper gray scales goes down and the lower part of the transfer curve defining lower gray scales goes up, so that an intermediate gray area is changed. The stretching determiner 105 analyzes a transfer curve of each local area to calculate an intermediate gray scale range which overlaps stretched upper gray scales and stretched lower gray scales.

Similar to the existing backlight dimming method, a local dimming method of the present invention divides a screen into a plurality of local dimming blocks and controls brightness of white light of a backlight in an individual local diming block. A feature that makes the local dimming method of the present invention different from the existing technology is that intense data stretching is performed in upper gray scales and lower gray scales to obtain an HDR image, while brightness of white light of a backlight compensates for undesired change of an intermediate gray scale. In addition, the local dimming method of the present invention increases brightness of white light in peak pixels in an area of an HDR image based on a result of analysis of W data after RGBW conversion, wherein the area is an area in which light irradiation is concentrated in the HDR image.

Using local dimming, the first dimming value generator 106 compensates invasion of data in a dark area of lower gray scales or a bright area of upper gray scales into an intermediate bright area. The first dimming value generator 106 readjusts brightness of pixels which overlap an intermediate gray scale area by adjusting a first dimming value of each local area. The first dimming value generated by the first dimming value generator 106 defines a dimming value of each local area, as shown in Equation 2. The first dimming value is generated as a high value in a local dimming block in which intense data stretching of upper gray scales has occurred, thereby increasing brightness of white light in the corresponding local dimming block. On the other hand, the first dimming value is generated as a low value in a local dimming block in which intense data stretching of lower gray scales has occurred, thereby reducing brightness of white light in the corresponding local dimming block.

$$Gain_{x,y} = \frac{mp_{x,y}}{p_{x,y}}$$ [Equation 3]

$$LD1_{i,j} = \left( \gamma \sum_{(x,y) \in LDB_{i,j}} \frac{1}{Gain_{x,y}} \right) / |LDB_{i,j}|$$

Herein, LDBi,j denotes the (i,j)-th local dimming block. A local dimming block is a unit block in which brightness of white light of a backlight is controlled independently according to a local dimming value. The local dimming block may be set to have size as the same as that of the aforementioned local block BL or local area WND in a pixel array, but may be set to have a different size. Thus, based on Equation 3, the first local dimming value LD1 in set in proportion to an average of inverses of gains that comprise a ratio of an output brightness value to an input brightness value.

LDi,j denotes the (i,j)-th local dimming value for dynamic range expansion. Px,y denotes brightness of a pixel located at (x,y). mpx,y denotes modulated brightness of a pixel located at (x,y). Gainx,y denotes a stretching rate of brightness of a pixel located at (x,y). A proportional constant γ controls tuning of the dimming rate.

The next step for obtaining an HDR image is restoring light irradiation in which the largest dynamic range is compressed in an LDR image. White light is primarily irradiated, and, due to adaption properties of an HVS, a peak effect of irradiation can be maximized when irradiation is concentrated not on the entire image, but on a portion of the image.

After RGB data is converted into RGBW data, the light irradiation determiner 108 compares W data of each pixel with a predetermined threshold, and detects a peak pixel having W data higher than the threshold as an irradiation pixel on which light irradiation is concentrated. Irradiation pixels indicate bright pixels having a high percentage of white light within an input image.

The second dimming value generator 109 receives location information of irradiation pixels and information on brightness of white light, calculates average brightness of light irradiation pixels in each local dimming block based on the received information, and generates a second dimming value required for increasing brightness of light irradiation pixels in each local dimming area based on the average brightness. The more pixels have high W data in a local dimming block, the higher second dimming value is generated to increase brightness of white light in the local dimming block.

The second dimming value obtained by the light irradiation determiner 108 and the second dimming value generator 109 is represented as in Equation 4.

$$LD2_{i,j} = \frac{\delta \times \frac{1}{|LDB_{i,j}|} \times \sum_{(x,y) \in LDB_{i,j}} (W_{x,y})}{\frac{1}{\forall (x,y)} \times \sum_{\forall (x,y)} (W_{x,y})}$$ [Equation 4]

Herein, Wx,y denotes a W data value, wherein the W data value is of a pixel located at (x,y) after RGBW conversion. | . . . | denotes a cardinality within a local dimming block LDBi,j, and, in other words, the number of pixels. δ denotes a constant value defined by a user for adjusting a peak level of an amount of light irradiation quantity. ∀(x, y) denotes all of the pixels in the entire image. Thus, based on Equation 4, the second dimming value LD2 is set proportionally to a ratio of a local average brightness of peak pixels in the local dimming block to a global average brightness of all of the pixels in the image.

The final dimming value generator 111 generates a final dimming value by multiplying the first dimming value and the second dimming value. The final dimming value is encoded into a dimming signal DIM, and then the dimming signal DIM is transmitted to the light source driver 202, as shown in FIG. 1. The light source driver 202 adjusts brightness of light sources in each local dimming block according to a diming value of a dimming signal DIM.

Figure 12:
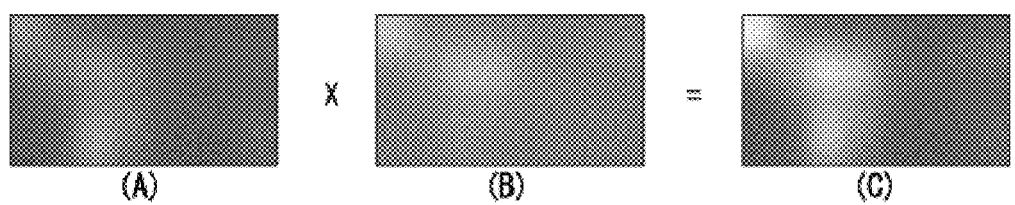
FIG. 12 is a diagram illustrating a local dimming method according to an exemplary embodiment of the present invention.

FIG. 12 illustrates a local dimming method when stretching is performed, as shown in diagram (B) of FIG. 11. Diagram (A) of FIG. 12 is an example in which light sources of a backlight are turned on using only the first dimming value generated by the first dimming value generator 106. Diagram (B) of FIG. 12 is an example in which light sources of a backlight are turned on using only the second dimming value generated by the second dimming value generator 109. Diagram (C) of FIG. 13 is an example in which light sources of a backlight are turned on using only the final dimming value that is obtained by multiplying the first dimming value and the second dimming value.

Figure 13:
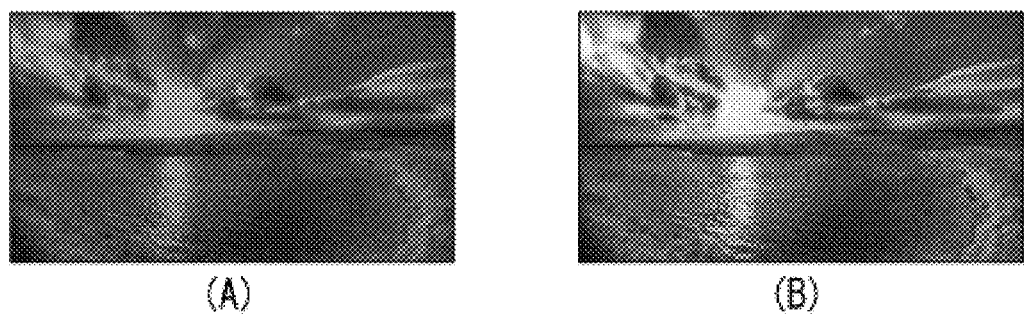
FIG. 13 is a diagram illustrating comparison between a Low Dynamic Range (LDR) input image before data stretching and an image on which data stretching and local dimming have been applied.

FIG. 13 is a diagram illustrating comparison between LDR input image (A) before data stretching and HDR image (B) to which the data stretching method and the local dimming method of the present invention are applied.

A display device according to an exemplary embodiment of the present invention is not limited to a LCD device. For example, an HDR image may be represented by applying the data stretching method and the white light quantity controlling method of the present invention to a RGB-type organic light-emitting diode (OLED) display device.

As described above, the present invention secures a physical capability of an HDR display device with low costs by using a RGBW-type display device, and causes a data stretching method and a backlight local dimming method to be optimized for an HDR image. As a result, it is possible not only to implement an HDR display device with low costs, but to reduce power consumption. For example, local dimming is optimized by increasing a data stretching rate of upper gray scales and lower gray scales in a dynamic range and analyzing a light irradiating area of an input image through analysis of W data after RGBW conversion, so that average power consumption of a backlight may be reduced to approximately 60% by the IEC 62087 standard.

In various embodiment, the various elements of FIG. 3 and the processes and functions attributed to those elements described herein can be implemented using digital circuits, analog circuits, field programmable gate arrays (FPGAs), application-specific integrated circuits (ASICs) or a combination thereof. Alternatively, one or more elements may be implemented as one or more processors (e.g., a general purpose processor, a digital signal processor, or image processor) and a non-transitory computer-readable storage medium that stores instructions that when executed by the one or more processors causes the one or more processors to carry out the functions described herein. In another embodiment, a combination of hardware and software elements may be used.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for generating pixel data in a display, the method comprising:
   receiving RGB pixel data corresponding to a target pixel of an image;
   determining a local adaption level for the RGB pixel data representing perceived brightness of the RGB pixel data;
   modifying the local adaption level to generate a modified local adaption level;
   generating a transfer curve mapping input values to output values, the transfer curve having a decreasing gradient for input values above the modified local adaption level and the transfer curve having an increasing gradient for input values below the modified local adaption level, and the transfer curve providing a 1:1 mapping at the modified local adaption level;
   applying the transfer curve to the input RGB pixel data to map the input RGB pixel data to output RGB pixel data;

converting the output RGB pixel data to RGBW pixel data to drive the target pixel;
generating for a local dimming block that includes the target pixel and a plurality of neighboring pixels, a first local dimming value from the RGB pixel data for each of the pixels within the local dimming block;
generating for the local dimming block, a second local diming value from the RGBW pixel data for each of the pixels within the local dimming block; and
generating a combined local dimming value to drive a light source driver of the display based on a combination of the first local dimming value and the second local dimming value.

2. The method of claim 1, wherein determining the local adaption level comprises:
generating a brightness value for the target pixel from the input RGB pixel data;
applying a bilateral filter to the brightness value for the target pixel that generates the local adaption level as a weighted combination of brightness values of neighboring pixels surrounding the target pixel within a local area and similarity measures between the brightness value of the target pixel and the brightness values of the neighboring pixels.

3. The method of claim 1, where modifying the local adaption level comprises:
shifting the local adaption level in a first direction by an intermediate gray scale value to generate a shifted local adaption level;
scaling the shifted local adaption level by a stretching intensity value to generate a scaled local adaption level; and
shifting the scaled local adaption level in a second direction by the intermediate gray scale value to generate a shifted and scaled local adaption level; and
constraining the shifted and scaled local adaption level to a range between a minimum pixel value and a maximum pixel value to generate the modified local adaption level.

4. The method of claim 1, wherein the transfer curve comprises an inflection point at an input value corresponding to the modified local adaption level.

5. The method of claim 1, wherein generating the first local dimming value comprises:
determining gains for each of the pixels in a local dimming block, each of the gains comprising a ratio of an output brightness value to an input brightness value;
setting the first local dimming value in proportion to an average of inverses of the gains.

6. The method of claim 1, wherein generating the second dimming value comprises:
detecting peak pixels in the image having white pixel data values higher than the predefined threshold;
determining a global average brightness of the peak pixels in the image;
determining a local average brightness of peak pixels in the local dimming block;
determining a ratio of the local average brightness to the global average brightness; and
generating the second dimming value proportionately to the ratio.

7. The method of claim 1, further comprising:
receiving gamma corrected RGB pixel data; and
performing de-gamma correction to generate the input RGB pixel data; and
performing gamma correction on the output RGBW pixel data.

8. The method of claim 1, wherein generating the combined local dimming value comprises determining a product of the first local dimming value and the second local dimming value.

9. An apparatus for generating pixel data in a display, the apparatus comprising:
a local adaption calculator circuit to receive RGB pixel data corresponding to a target pixel of an image, to determine a local adaption level for the RGB pixel data representing perceived brightness of the RGB pixel data, and to modify the local adaption level to generate a modified local adaption level;
a transfer curve generator circuit to generate a transfer curve mapping input values to output values, the transfer curve having a decreasing gradient for input values above the modified local adaption level and the transfer curve having an increasing gradient for input values below the modified local adaption level, and the transfer curve providing a 1:1 mapping at the modified local adaption level;
a data stretcher circuit to apply the transfer curve to the input RGB pixel data to map the input RGB pixel data to output RGB pixel data;
an RGBW converter circuit to convert the output RGB pixel data to RGBW pixel data to drive the target pixel; and
a first dimming circuit to generate, for a local dimming block that includes the target pixel and a plurality of neighboring pixels, a first local dimming value from the RGB pixel data for each of the pixels within the local dimming block;
a second dimming circuit to generate for the local dimming block, a second local dimming value from the RGBW pixel data for each of the pixels within the local dimming block;
a final dimming value generator circuit to generate a combined local dimming value based on a combination of the first local dimming value and the second local dimming value.

10. The apparatus of claim 9, wherein the local adaption calculator circuit comprises:
a brightness value generator circuit to generate a brightness value for the target pixel from the input RGB pixel data; and
a bilateral filter to filter the brightness value for the target pixel to generate the local adaption level as a weighted combination of brightness values of neighboring pixels surrounding the target pixel within a local area and similarity measures between the brightness value for the target pixel and the brightness values for the neighboring pixels.

11. The apparatus of claim 9, wherein the local adaption calculator circuit comprises:
a first adder circuit to shift the local adaption level in a first direction by an intermediate gray scale value to generate a shifted local adaption level;
a scaler circuit to scale the shifted local adaption level by a stretching intensity value to generate a scaled local adaption level; and
a second adder circuit to shift the scaled local adaption level in a second direction by the intermediate gray scale value to generate a shifted and scaled local adaption level; and
a constrainer circuit to constrain the shifted and scaled local adaption level to a range between a minimum pixel value and a maximum pixel value to generate the modified local adaption level.

12. The apparatus of claim 9, wherein the transfer curve comprises an inflection point at an input value corresponding to the modified local adaption level.

13. The apparatus of claim 9, wherein the first dimming circuit comprises:
a stretching determiner circuit to determine gains for each of the pixels in a local dimming block, each of the gains comprising a ratio of an output brightness value to an input brightness value;
and first dimming value generator circuit to set the first local dimming value in proportion to an average of inverses of the gains.

14. The apparatus of claim 9, wherein the second dimming circuit comprises:
a light irradiation determiner circuit to detect peak pixels in the image having white pixel data values higher than the predefined threshold, determine a global average brightness of the peak pixels in the image, and determine a local average brightness of peak pixels in the local dimming block;
a second dimming value generator circuit to determine a ratio of the local average brightness to the global average brightness, and generate the second dimming value proportionately to the ratio.

15. The apparatus of claim 9, further comprising:
a de-gamma corrector circuit to receive gamma corrected RGB pixel data, and perform de-gamma correction to generate the input RGB pixel data; and
a gamma corrector circuit to perform gamma correction on the output RGBW pixel data.

16. A non-transitory computer-readable storage medium storing instructions for generating pixel data in a display, the instructions when executed by a processing causing the processor to perform steps including:
receiving RGB pixel data corresponding to a target pixel of an image;
determining a local adaption level for the RGB pixel data representing perceived brightness of the RGB pixel data;
modifying the local adaption level to generate a modified local adaption level;
generating a transfer curve mapping input values to output values, the transfer curve having a decreasing gradient for input values above the modified local adaption level and the transfer curve having an increasing gradient for input values below the modified local adaption level, and the transfer curve providing a 1:1 mapping at the modified local adaption level;
applying the transfer curve to the input RGB pixel data to map the input RGB pixel data to output RGB pixel data;
converting the output RGB pixel data to RGBW pixel data to drive the target pixel;
generating for a local dimming block that includes the target pixel and a plurality of neighboring pixels, a first local dimming value from the RGB pixel data for each of the pixels within the local dimming block;
generating for the local dimming block, a second local diming value from the RGBW pixel data for each of the pixels within the local dimming block; and
generating a combined local dimming value to drive a light source driver of the display based on a combination of the first local dimming value and the second local dimming value.

17. The non-transitory computer-readable storage medium of claim 16, wherein determining the local adaption level comprises:
generating a brightness value for the target pixel from the input RGB pixel data;
applying a bilateral filter to the brightness value for the target pixel that generates the local adaption level as a weighted combination of brightness values of neighboring pixels surrounding the target pixel within a local area and similarity measures between the brightness value of the target pixel and the brightness values of the neighboring pixels.

18. The non-transitory computer-readable storage medium of claim 16, where modifying the local adaption level comprises:
shifting the local adaption level in a first direction by an intermediate gray scale value to generate a shifted local adaption level;
scaling the shifted local adaption level by a stretching intensity value to generate a scaled local adaption level; and
shifting the scaled local adaption level in a second direction by the intermediate gray scale value to generate a shifted and scaled local adaption level; and
constraining the shifted and scaled local adaption level to a range between a minimum pixel value and a maximum pixel value to generate the modified local adaption level.

19. The non-transitory computer-readable storage medium of claim 16, wherein the transfer curve comprises an inflection point at an input value corresponding to the modified local adaption level.

20. The non-transitory computer-readable storage medium of claim 16, wherein generating the combined local dimming value comprises determining a product of the first local dimming value and the second local dimming value.

21. The apparatus of claim 16, wherein the final dimming value generator circuit is configured to generate the combined local dimming value as a product of the first local dimming value and the second local dimming value.

* * * * *